US011455203B2

(12) United States Patent
Ochiai

(10) Patent No.: US 11,455,203 B2
(45) Date of Patent: Sep. 27, 2022

(54) ABNORMALITY DETECTION SUPPORT DEVICE, ABNORMALITY DETECTION SUPPORT METHOD, AND PROGRAM

(71) Applicant: NEC CORPORATION, Tokyo (JP)

(72) Inventor: Katsuhiro Ochiai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 16/333,061

(22) PCT Filed: Sep. 13, 2017

(86) PCT No.: PCT/JP2017/033019
§ 371 (c)(1),
(2) Date: Mar. 13, 2019

(87) PCT Pub. No.: WO2018/052015
PCT Pub. Date: Mar. 22, 2018

(65) Prior Publication Data
US 2019/0266039 A1 Aug. 29, 2019

(30) Foreign Application Priority Data
Sep. 14, 2016 (JP) .............................. JP2016-179287

(51) Int. Cl.
*G06F 11/07* (2006.01)
*G05B 23/02* (2006.01)

(52) U.S. Cl.
CPC ............ *G06F 11/079* (2013.01); *G05B 23/02* (2013.01); *G06F 11/0751* (2013.01); *G06F 11/0754* (2013.01); *G06F 11/0775* (2013.01)

(58) Field of Classification Search
CPC ............... G06F 11/079; G06F 11/0751; G06F 11/0754; G06F 11/0775; G05B 23/02
See application file for complete search history.

(56) References Cited

U.S. PATENT DOCUMENTS 6,532,440 B1 * 3/2003 Boppana .......... G01R 31/31835
703/14
6,834,256 B2 * 12/2004 House .................... H02P 29/02
318/565

(Continued)

FOREIGN PATENT DOCUMENTS

JP 2004-240642 A 8/2004
JP 2007-156653 A 6/2007

(Continued)

OTHER PUBLICATIONS

International Search Report of PCT/JP2017/033019 dated Dec. 5, 2017.

(Continued)

*Primary Examiner* — Matthew M Kim
*Assistant Examiner* — Indranil Chowdhury
(74) *Attorney, Agent, or Firm* — Sughrue Mion, PLLC

(57) ABSTRACT

A system analysis support device includes a data acquisition part that obtains time series data (items) measured in a system that is to be analyzed, an overall abnormality degree calculation part that calculates transition of abnormality degree representing overall abnormality degree of the system that is to be analyzed, using a predictive model generated so that, with 2 or more time series data (items) as input, values representing a relationship between the 2 or more time series data (items) are outputted, and the time series data (items), and a representative index selection part that selects and presents time series data (items) indicating change similar to transition of the overall abnormality degree of the system that is to be analyzed, from among the time series data (items).

10 Claims, 21 Drawing Sheets

(56) References Cited

U.S. PATENT DOCUMENTS

| | | | |
|---|---|---|---|
| 7,315,856 B2* | 1/2008 | Iulo | G06F 8/71 |
| | | | 707/917 |
| 7,975,186 B2 | 7/2011 | Kato | |
| 8,190,949 B2 | 5/2012 | Kato | |
| 8,286,035 B2 | 10/2012 | Kato | |
| 9,189,485 B2 | 11/2015 | Suzuki et al. | |
| 10,025,653 B2* | 7/2018 | Goldstein | G05B 23/0254 |
| 10,521,193 B2* | 12/2019 | Tasaki | G06F 16/9024 |
| 11,222,077 B1* | 1/2022 | Martin | G06N 20/10 |
| 2009/0217099 A1 | 8/2009 | Kato | |
| 2011/0225462 A1 | 9/2011 | Kato | |
| 2012/0192014 A1 | 7/2012 | Kato | |
| 2013/0097128 A1 | 4/2013 | Suzuki et al. | |
| 2013/0132000 A1* | 5/2013 | Tamaki | G05B 23/0281 |
| | | | 702/35 |
| 2014/0157061 A1* | 6/2014 | Bird | G06F 11/079 |
| | | | 714/47.1 |
| 2014/0157235 A1* | 6/2014 | Bird | G06F 8/70 |
| | | | 717/121 |
| 2015/0205825 A1* | 7/2015 | Sengupta | G06Q 10/0637 |
| | | | 707/758 |
| 2015/0205827 A1* | 7/2015 | Sengupta | G06Q 10/0637 |
| | | | 707/690 |
| 2015/0206055 A1* | 7/2015 | Sengupta | G06Q 10/067 |
| | | | 706/11 |
| 2016/0154690 A1* | 6/2016 | Horrell | G01M 99/005 |
| | | | 714/57 |
| 2016/0342392 A1* | 11/2016 | Tasaki | G06F 7/20 |
| 2018/0231969 A1* | 8/2018 | Noda | G05B 23/02 |
| 2018/0239345 A1* | 8/2018 | Noda | G05B 23/024 |
| 2018/0293502 A1* | 10/2018 | Sengupta | G06Q 30/01 |
| 2021/0191726 A1* | 6/2021 | Tarango | G06K 9/6256 |
| 2021/0255613 A1* | 8/2021 | Mizobuchi | G05B 23/024 |
| 2021/0263483 A1* | 8/2021 | Masuzaki | G06N 20/00 |

FOREIGN PATENT DOCUMENTS

| | | | | |
|---|---|---|---|---|
| JP | 2009-199533 A | 9/2009 | | |
| JP | 2010-170178 A | 8/2010 | | |
| JP | 2013-218725 A | 10/2013 | | |
| JP | 2015-088078 A | 5/2015 | | |
| JP | 2015-152933 A | 8/2015 | | |
| WO | 2011/135606 A1 | 11/2011 | | |
| WO | 2014/142152 A1 | 9/2014 | | |
| WO | WO-2019073512 A1 * | 4/2019 | | G05B 23/024 |

OTHER PUBLICATIONS

Japanese Office Action for JP Application No. 2018-539744 dated Feb. 22, 2022 with English Translation.

* cited by examiner

FIG. 10
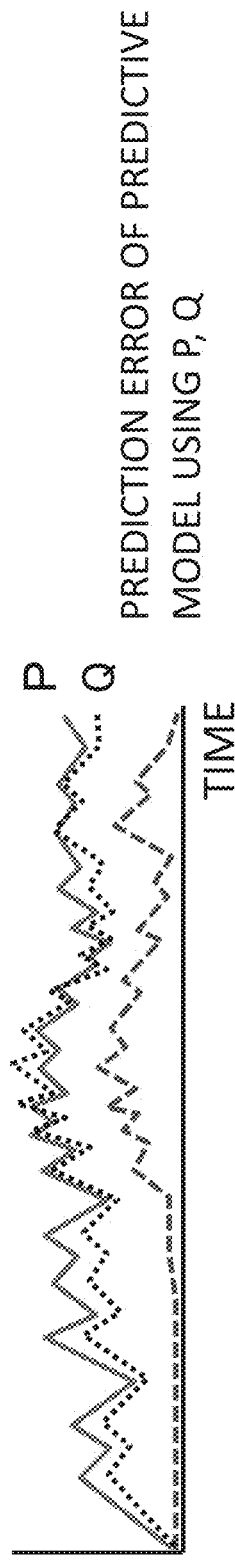
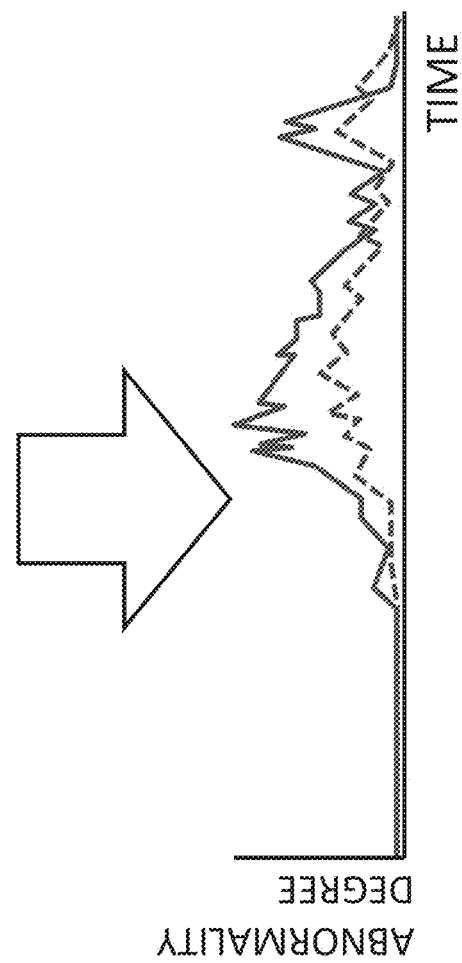

FIG. 12
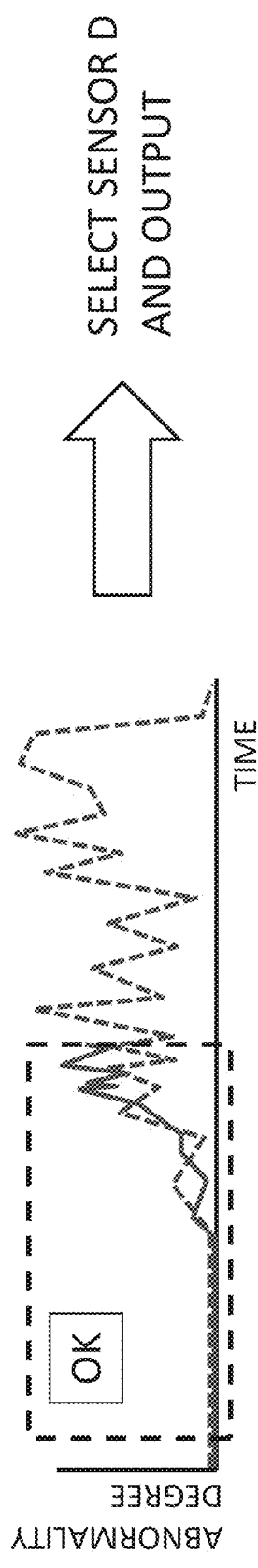
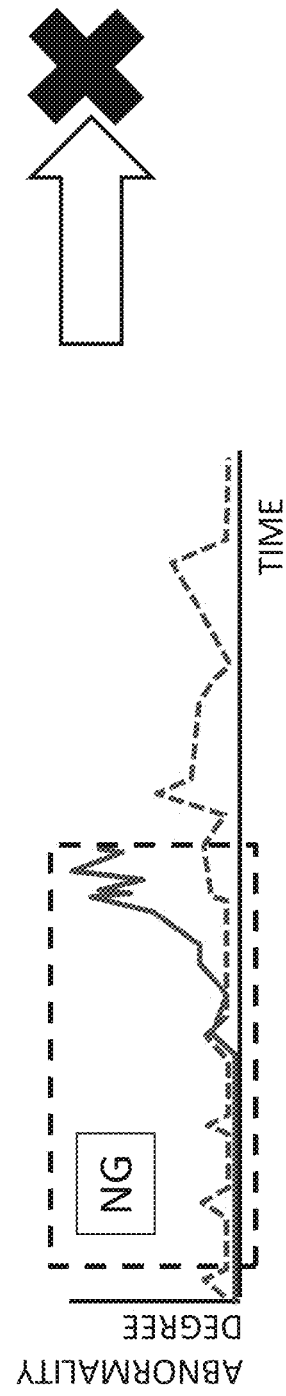

FIG. 15

| ORDER | SENSOR NAME | RELATIVE TIME k (SECS) | SIMILARITY DEGREE | |
|---|---|---|---|---|
| 1 | TEMPERATURE 1 | -50 | 80 | ADVANCE SENSOR (CAUSE) |
| 2 | RATE OF FLOW 1 | -35 | 65 | ADVANCE SENSOR (CAUSE) |
| 3 | AMPLITUDE 1 | -10 | 82 | ADVANCE SENSOR (CAUSE) |
| 4 | AMPLITUDE 2 | 0 | 92 | SAME TIME SENSOR (CAUSE OR RESULT UNKNOWN) |
| 5 | TEMPERATURE 2 | 0 | 85 | SAME TIME SENSOR (CAUSE OR RESULT UNKNOWN) |
| 6 | TEMPERATURE 3 | 0 | 46 | SAME TIME SENSOR (CAUSE OR RESULT UNKNOWN) |
| 7 | RATE OF FLOW 2 | 5 | 72 | DELAY SENSOR (RESULT) |
| 8 | TEMPERATURE 4 | 40 | 53 | DELAY SENSOR (RESULT) |
| 9 | AMPLITUDE 3 | 100 | 91 | DELAY SENSOR (RESULT) |

FIG. 16

| ORDER | SENSOR NAME 1 | SENSOR NAME 2 | RELATIVE TIME k (SECS) | SIMILARITY DEGREE | |
|---|---|---|---|---|---|
| 1 | TEMPERATURE 1 | TEMPERATURE 2 | -50 | 80 | ADVANCE MODEL (CAUSE) |
| 2 | RATE OF FLOW 1 | TEMPERATURE 2 | -35 | 65 | |
| 3 | AMPLITUDE 1 | TEMPERATURE 3 | -10 | 82 | |
| 4 | AMPLITUDE 2 | AMPLITUDE 1 | 0 | 92 | SAME TIME MODEL (CAUSE OR RESULT UNKNOWN) |
| 5 | TEMPERATURE 2 | TEMPERATURE 3 | 0 | 85 | |
| 6 | TEMPERATURE 3 | TEMPERATURE 2 | 0 | 46 | |
| 7 | RATE OF FLOW 2 | RATE OF FLOW 3 | 5 | 72 | DELAY MODEL (RESULT) |
| 8 | TEMPERATURE 4 | AMPLITUDE 4 | 40 | 53 | |
| 9 | AMPLITUDE 3 | RATE OF FLOW 4 | 100 | 91 | |

FIG. 18

| ORDER | SENSOR NAME | GRAPH | EXCLUDED |
|---|---|---|---|
| 1 | TEMPERATURE 1 | | ☑ |
| 2 | RATE OF FLOW 1 | | ☑ |
| 3 | AMPLITUDE 1 | | ☑ |
| 4 | AMPLITUDE 2 | | ☐ |
| 5 | TEMPERATURE 2 | | ☐ |
| 6 | TEMPERATURE 3 | | ☑ |
| 7 | RATE OF FLOW 2 | | ☑ |
| 8 | TEMPERATURE 4 | | ☐ |

FIG. 20

| ORDER | SENSOR NAME | SIMILARITY | GRAPH | EXCLUDED |
|---|---|---|---|---|
| 1 | TEMPERATURE 1 | 92 | ～ | ▶ |
| 2 | RATE OF FLOW 1 | 91 | ～ | ▶ |
| 3 | AMPLITUDE 1 | 90 | ～ | ▶ |
| 4 | AMPLITUDE 2 | 89 | ～ | ☐ |
| 5 | TEMPERATURE 2 | 80 | ～ | ☐ |
| 6 | TEMPERATURE 3 | 77 | ～ | ▶ |
| 7 | RATE OF FLOW 2 | 75 | ～ | ▶ |
| 8 | TEMPERATURE 4 | 55 | ～ | ☐ |
| | | UPDATE ～300 | | |

FIG. 21

| ORDER | SENSOR NAME | SIMILARITY | GRAPH | EXCLUDED |
|---|---|---|---|---|
| 4 | AMPLITUDE 2 | 89 | | ☐ |
| 5 | TEMPERATURE 2 | 80 | | ☐ |
| 8 | TEMPERATURE 4 | 55 | | ☐ |
| | | UPDATE ~300 | | |

ABNORMALITY DETECTION SUPPORT DEVICE, ABNORMALITY DETECTION SUPPORT METHOD, AND PROGRAM

CROSS-REFERENCE TO RELATED APPLICATIONS

The present application is a National Stage of International Application No. PCT/JP20171033019 (filed Sep. 13, 2017), and claims priority from Japanese Patent Application No. 2016-179287 (filed on Sep. 14, 2016), the contents of which are hereby incorporated in their entirety by reference into this specification. The present invention relates to a system analysis support device, a system analysis support method, and a program, and in particular to a system analysis support device, a system analysis support method, and a program, that support analysis operations for system fault analysis and predictive detection of malfunctions.

FIELD

Background

Patent Literature (PTL) 1 discloses an operations management device in which it is possible to predictively detect malfunctions of a management device configuring a system. Specifically, the operations management device includes: a correlation model generation part 123 that, with a performance item or management device as an element, derives a correlation function of at least first performance series information indicating a time series change of performance information related to a first element, and second performance series information indicating a time series change of performance information related to a second element, generates a correlation model based on the correlation function, and obtains this correlation model for a combination among the respective elements; and a correlation change analysis part 124 that analyzes change of correlation model based on performance information newly detected and obtained from the management device.

Patent Literature 2 discloses an abnormality detection system that predictively detects a system abnormality using a data analysis method known as clustering. Patent Literature 3 discloses an abnormality detection method in which data are obtained from a plurality of sensors, and based on degree of similarity among the data, in a case of data in which the degree of similarity among the data is low, by performing addition or removal of data with regard to learning data, using existence or nonexistence of an abnormality in the data, the learning data is generated/updated, and, based on deviation of individual data items included in the learning data, and newly obtained observed data, abnormality in observed data is detected.

[PTL 1]
Japanese Patent Kokai Publication No. JP2009-199533A
[PTL 2]
Japanese Patent Kokai Publication No. JP2015-88078A
[PTL 3]
Japanese Patent Kokai Publication No. JP2013-218725A.

SUMMARY

The following analysis is given according to the present invention. In the abnormality determination method according to accumulation of abnormality degree as represented in Patent Literature 1, according to prediction error being large or duration thereof or a combination thereof, the abnormality degree is calculated and an abnormal invariant or sensor is identified (for example, refer to FIG. 14 in Patent Literature 1).

In a case of identifying an abnormality cause having only a high or low score with regard to the abovementioned abnormality degree, events that occurred incidentally, events that occurred as a result (of a true cause), or events indicating an abnormality even in a normal period may affect abnormality degree score. Since it is difficult for these to be automatically determined, it has been necessary to individually determine and screen out sensor values related to these events or predictive models using these.

It is an object of the present invention to provide a system analysis support device, a system analysis support method, and a program, that can perform system abnormality detection, abnormality monitoring, and abnormality cause identification with good accuracy, without performing a process of screening out sensor values or predictive models in system invariant analysis as represented in the abovementioned Patent Literature 1.

According to a first aspect, a system analysis support device is provided that includes a data acquisition part that obtains time series data (items) measured in a system that is to be analyzed. The analysis support device further includes an overall abnormality degree calculation part that calculates transition of overall abnormality degree of the system to be analyzed, using a predictive model generated so that, with 2 or more time series data (items) as input, values representing a relationship between the 2 or more time series data items are outputted, and the time series data (items). The analysis support device further includes an overall operation representative value extraction part that selects and presents time series data (items) indicating change similar to transition of overall abnormality degree of the system that is to be analyzed, from among the time series data (items).

According to a second aspect, a system analysis support method is provided for a computer comprising a storage part that stores a predictive model generated so that, with 2 or more time series data (items) as input, values representing a relationship between the 2 or more time series data (items) are outputted, and a calculation part that calculates transition of abnormality degree representing overall abnormality degree of a prescribed system that is to be analyzed, using the predictive model and the time series data (items), wherein the computer obtains time series data (items) measured in a system that is to be analyzed, calculates transition of abnormality degree representing overall abnormality degree of the prescribed system that is to be analyzed, and selects and presents time series data (items) indicating change similar to transition of overall abnormality degree of the system that is to be analyzed, from among the time series data (items). The present method is associated with a particular apparatus, referred to as a computer that has the abovementioned storage part and calculation part (processor).

According a third aspect, a program is provided that causes execution of a computer including a storage part that stores a predictive model generated so that, with 2 or more time series data (items) as input, values representing a relationship between the 2 or more time series data (items) are outputted, and a calculation part that calculates transition of abnormality degree representing overall abnormality degree of a prescribed system that is to be analyzed, using the predictive model and the time series data (items), wherein the computer executes: a process of obtaining time series data (items) measured in a system that is to be analyzed, a process of calculating transition of abnormality degree representing overall abnormality degree of the prescribed system that is to be analyzed, and a process of selecting and presenting time series data (items) indicating change similar to transition of overall abnormality degree of the system that is to be analyzed, from among the time series data (items), to a user. It is to be noted that this program may be recorded on a computer-readable (non-transient) storage medium. That is, the present invention may be embodied as a computer program product.

According to the present invention, facilitation and accuracy improvement are realized for abnormality detection, abnormality monitoring, and abnormality cause identification for a system. That is, the present invention, converts a system analysis support device disclosed in background art to a system analysis support device having dramatically improved performance.

BRIEF DESCRIPTION OF DRAWINGS

FIG. 10 is a diagram for describing an operation of selection of a predictive model, which is a representative index by the analysis support device in the modified exemplary embodiment of the first exemplary embodiment of the invention.

FIG. 12 is a diagram for describing an operation of selection of sensor, which is a representative index by the analysis support device in the first exemplary embodiment of the invention.

FIG. 15 is a diagram for describing an example of outputting a sensor list by the analysis support device in the third exemplary embodiment of the invention.

FIG. 16 is a diagram for describing another example of outputting a sensor list by the analysis support device in the third exemplary embodiment of the invention.

FIG. 18 is a diagram showing an example of a user interface for receiving a selection of a sensor not used in calculation of overall abnormality degree by an analysis support device in the fourth exemplary embodiment of the invention.

FIG. 20 is a diagram showing an example of a user interface for selecting and receiving time series data excluded from the sensor list by the analysis support device in the fifth exemplary embodiment of the invention.

FIG. 21 is a diagram showing a sensor list after an updating button of FIG. 20 is clicked.

PREFERRED EXEMPLARY EMBODIMENTS

Figure 1:
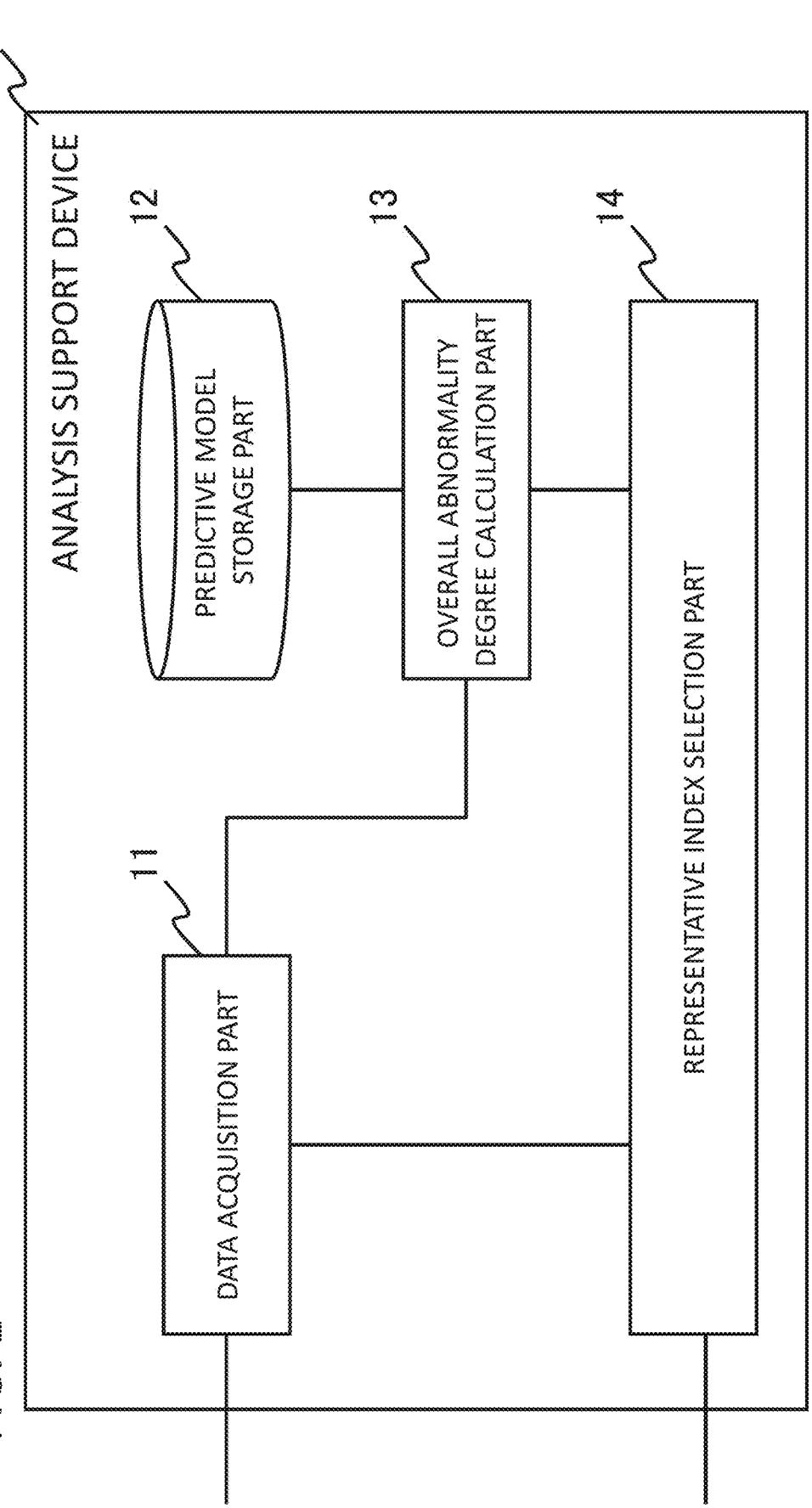
FIG. 1 is a diagram showing a configuration of an exemplary embodiment of the present invention.

First, a description is given of an outline of an exemplary embodiment of the present invention, making reference to the drawings. It is to be noted that reference symbols in the drawings attached to this outline are added to respective elements for convenience, as examples in order to aid understanding, and are not intended to limit the present invention to modes illustrated in the drawings. Connection lines between blocks in the diagrams referred to in the following description include both unidirectional and bidirectional. Unidirectional arrows schematically show flow of main signals (data), but do not exclude bidirectionality.

The present invention, in an exemplary embodiment thereof as shown in FIG. 1, may be realized by a configuration including a data acquisition part 11 that obtains time series data items (may be termed as "time series data", hereinafter) measured in a system that is to be analyzed, a predictive model (refer to a predictive model storage part 12 in FIG. 1) generated so that, with 2 or more time series data (items) as input, value(s) representing relationship(s) between the 2 or more time series data (items) are outputted, an overall abnormality degree calculation part 13 that calculates transition of abnormality degree representing overall abnormality degree of the system that is to be analyzed, and a representative index selection part 14.

Figure 2:
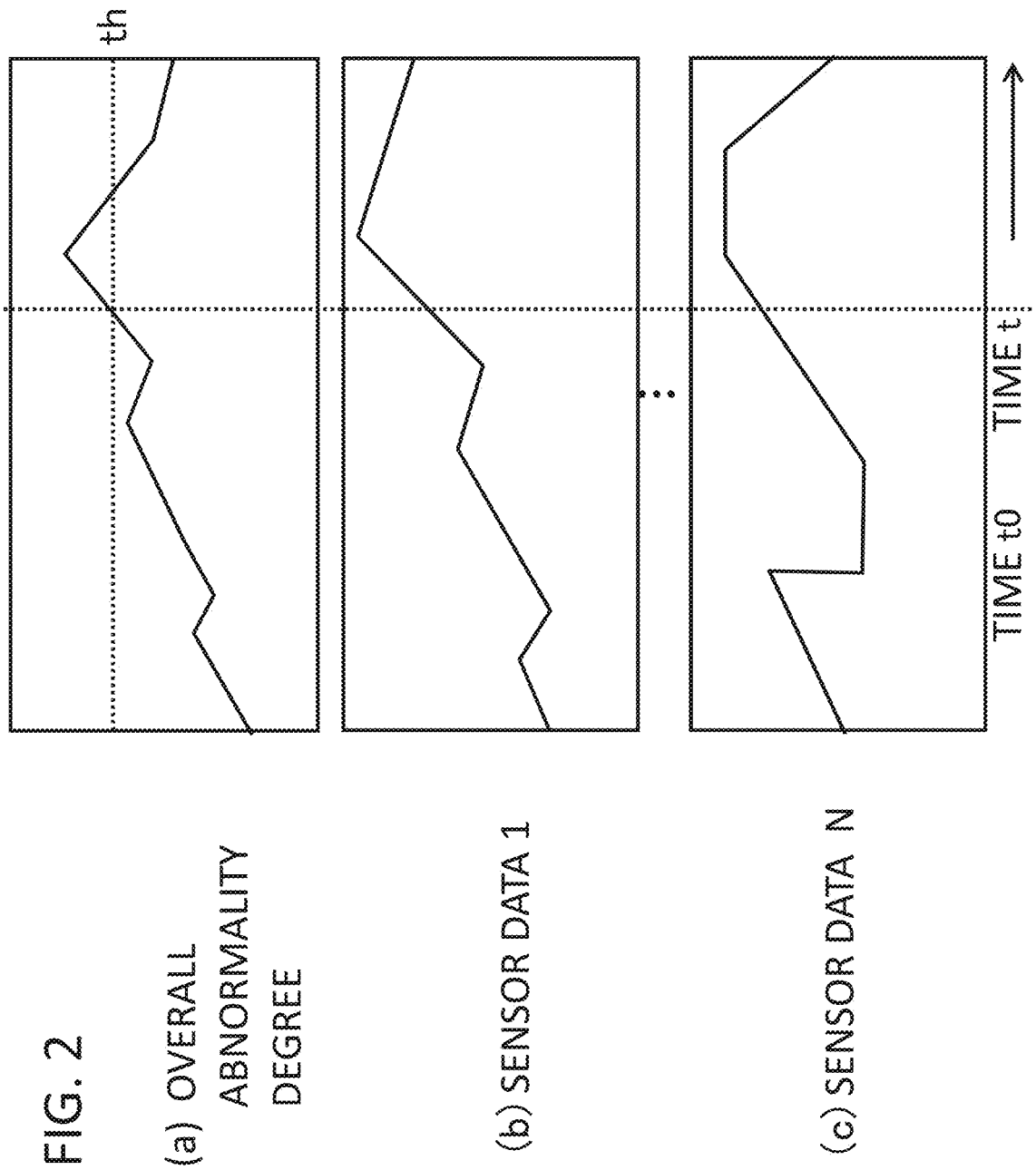
FIG. 2 is a diagram for describing operations of an exemplary embodiment of the invention.

More specifically, the representative index selection part 14 selects and presents time series data indicating change similar to a transition of overall abnormality degree of the system that is to be analyzed, from among time series data. For example, a calculation result indicating change of overall abnormality degree as in (a) of FIG. 2 is obtained. In (a) of FIG. 2, a determination is made that at time t, overall abnormality degree exceeds threshold th, and an abnormality occurs in the system.

For this type of transition of overall abnormality degree, there is increase trend at time t for both sensor data 1 and sensor data N, but change does not necessarily resemble overall abnormality degree transition, such as sensor data N value dropping rapidly at time t0. Meanwhile, sensor data 1 indicates that for all intervals, similarity degree is high, such as increase and decrease trends matching overall abnormality degree. In this case, the representative index selection part 14 selects sensor data 1 as a representative index, and presents this to a user. It is to be noted that the similarly degree, on creating a prediction formula among the sensor data, can perform calculation according to error between predicted value and actually measured value. For example, in a case of calculating similarity degree between sensor data 1 and overall abnormality degree, a prediction formula is created to predict overall abnormality degree from the sensor data 1, and calculation is performed according to error between the predicted value and the actually measured value. Clearly, it is also possible to use various types of other methods as the method of calculating waveform similarity degree.

A user who obtains this type of result can thereafter focus on sensor data 1, to consider a mechanism for performing detection of system abnormality, or perform abnormality monitoring by the sensor data 1, or perform identification of abnormality cause using sensor data 1.

In particular in a large scale system as described at the outset of this document, for countless sensors, effects are due not only to human causes but also to weather and seasonal changes, so that various events occur. By using the present invention, it is possible to sift out sensor data of values not worth being focused on, and to present important sensor data to the user. Clearly, the user can focus not only on presented sensor values, but can create a predictive model using a sensor other than the sensor in question, and can perform evaluation of an existing predictive model using the presented sensor data.

First Exemplary Embodiment

Figure 3:
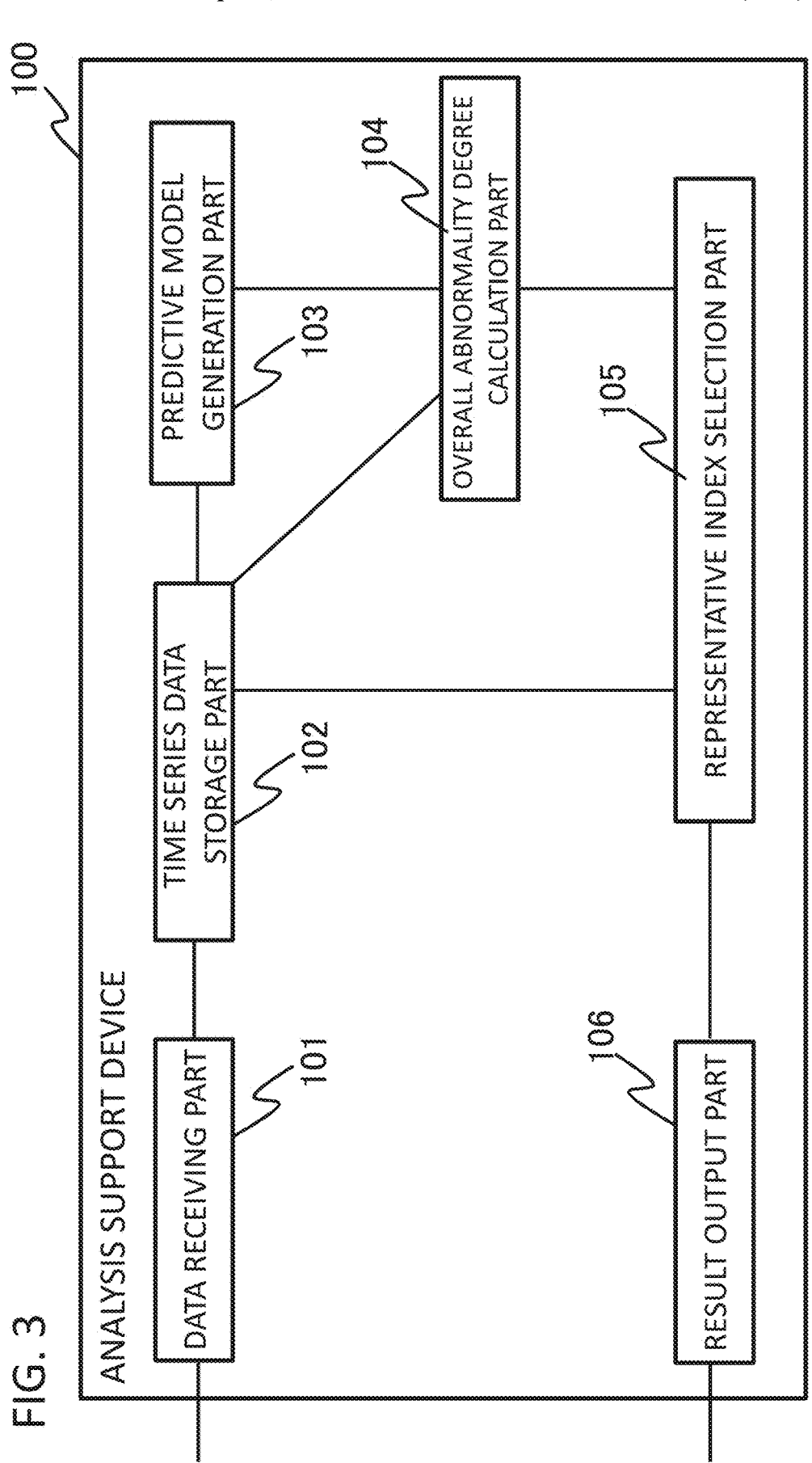
FIG. 3 is a block diagram showing a configuration of an analysis support device in a first exemplary embodiment of the invention.

Next, a detailed description is given concerning a first exemplary embodiment of the present invention, making reference to the drawings. FIG. 3 is a diagram showing a configuration of an analysis support device of the first exemplary embodiment of the invention. FIG. 3 shows an analysis support device 100 provided with a data receiving part 101, a time series data storage part 102, a predictive model generation part 103, an overall abnormality degree calculation part 104, a representative index selection part 105, and a result output part 106.

The data receiving part 101 receives time series data from various types of sensor included in the system and accumulates them in the time series data storage part 102. It is to be noted that embodiments in which the data receiving part 101 collects data from various types of sensor, include an embodiment in which the data receiving part 101 directly receives time series data from a sensor or an IoT (Internet of Things) terminal or the like connected to a sensor, and an embodiment in which the data receiving part 101 obtains necessary time series data from a server or the like disposed in a cloud system or the like.

The time series data storage part 102 is configured by a database or the like that holds data collected by the data receiving part 101 as respective time series data.

Figure 4:
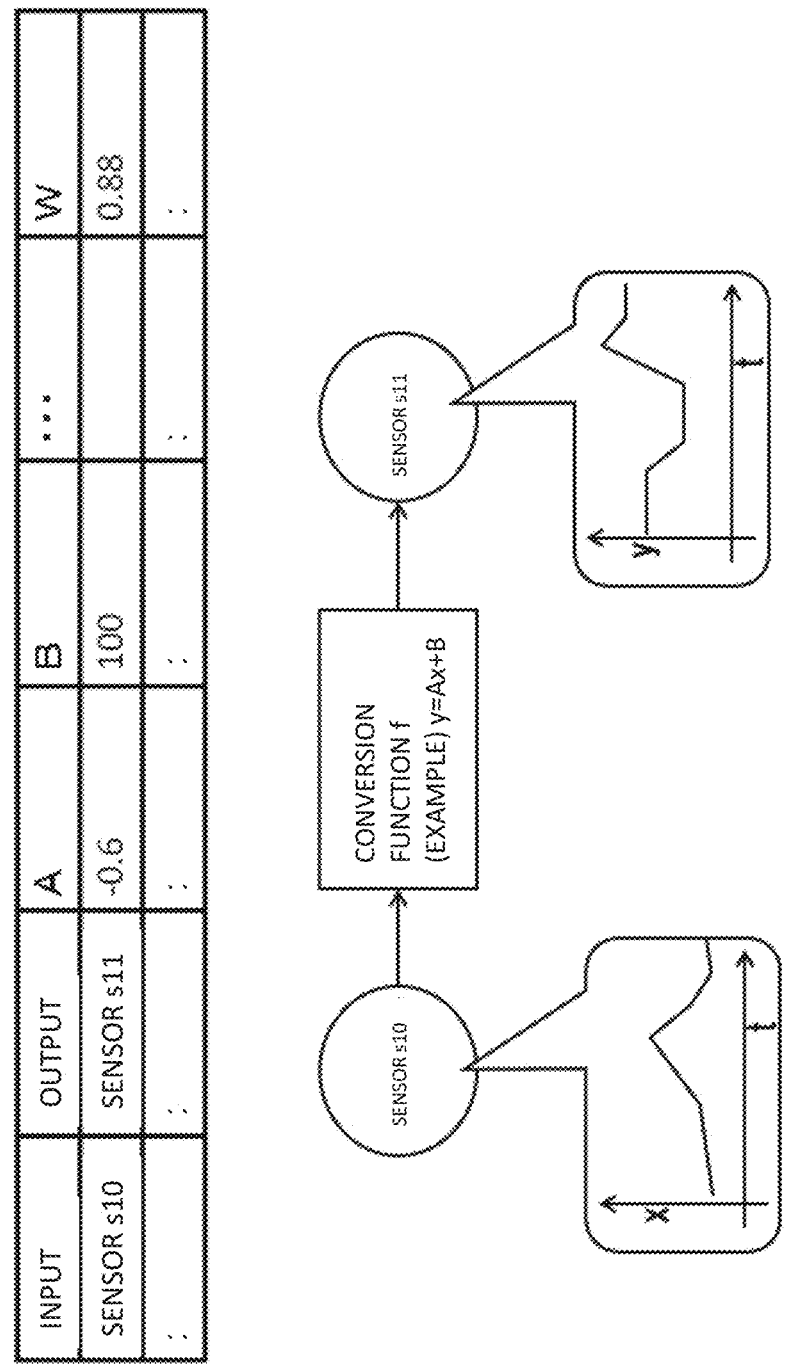
FIG. 4 is a diagram for describing relationships between sensor values used by an operations management system in the first exemplary embodiment of the invention.

The predictive model generation part 103 generates a predictive model (correlation model) using time series data of a learning period in question (learning interval), among the time series data accumulated in the time series data storage part 102. Specifically, the predictive model generation part 103 derives a correlation function among 2 or more time series data items of the learning interval, generates a predictive model (correlation model) based on the correlation function, and obtains the predictive model (correlation model) with regard to a combination among respective sensor data items. For example, as shown in FIG. 4, by deriving a conversion function f in a case where time series data of a certain sensor s10 is inputted, and time series data of another second sensor s11 is outputted, a relationship between sensors s10 and s11 is obtained. In a case where there is a difference in the actual time series data and values obtained according to the conversion function f, as necessary, weighting information w as shown in FIG. 4 or reliability information may be computed and stored together conversion function.

Figure 5:
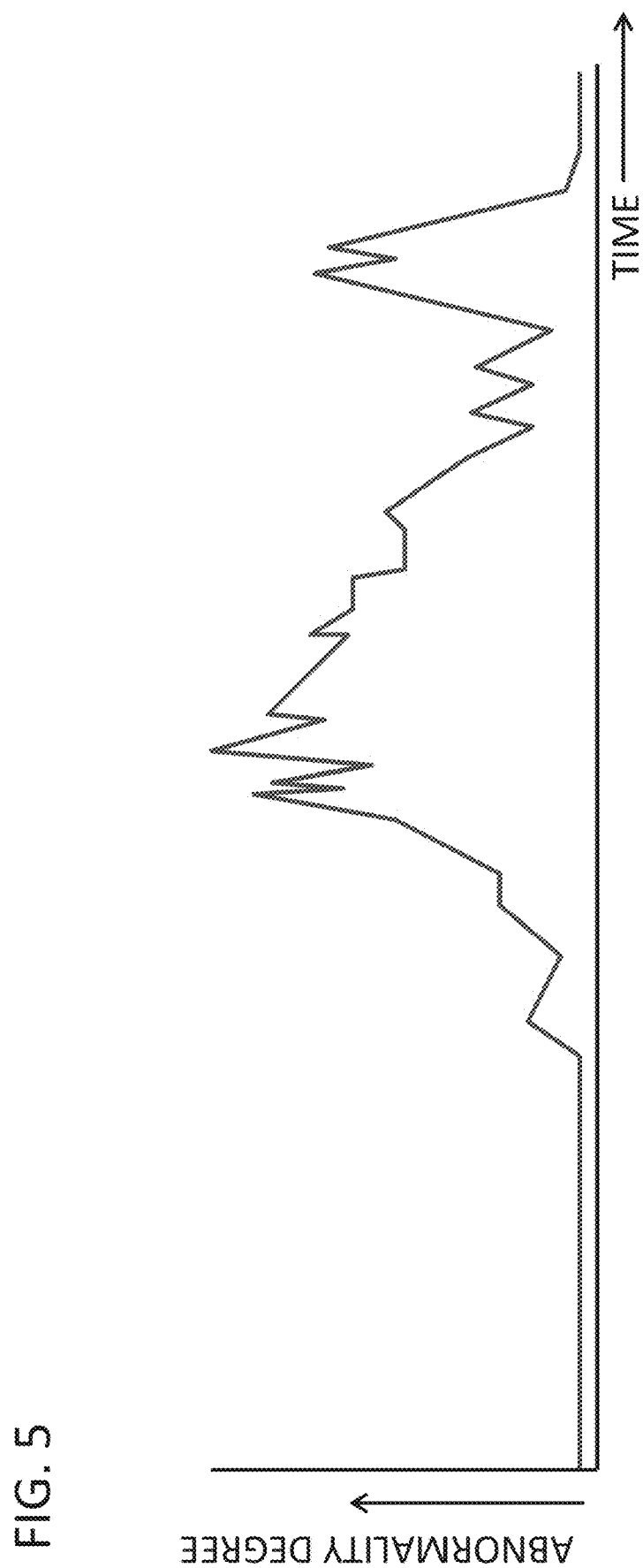
FIG. 5 is a diagram showing an example of calculating overall abnormality degree by an analysis support device in the first exemplary embodiment of the invention.

The overall abnormality degree calculation part 104 uses prediction error, which is the difference between actual time series data and values obtained by inputting time series data for an arbitrary period to a predictive model (correlation model), or a continuous period thereof, or a numerical formula of a combination thereof, to calculate time series change of overall abnormality degree of a system that is to be analyzed. FIG. 5 is a diagram showing an example of calculating overall abnormality degree by the overall abnormality degree calculation device 104. The transition of abnormality degree in FIG. 5 may be said to be one of aggregating abnormality degree (broken condition) of an actual system, with respect to overall normal-time predicted behavior of the system. For example, where the abnormality degree shown in FIG. 5 exceeds a prescribed threshold, a determination may be made that some sort of abnormality is occurring in the system that is to be analyzed.

The representative index selection part 105 selects 1 or more items of sensor data indicating movement similar to time series change of overall abnormality degree calculated by the overall abnormality degree calculation part 104, from among the time series data accumulated in the time series data storage part 102. It is to be noted that the time series data "indicating similar movement" may be obtained by regression analysis or multivariate analysis, with modeling by an ARX (Auto-Regressive eXogeneous) model having overall abnormality degree as object variable, modeling by regression analysis such as Lasso, modeling by principal component analysis or the like.

Figure 6:
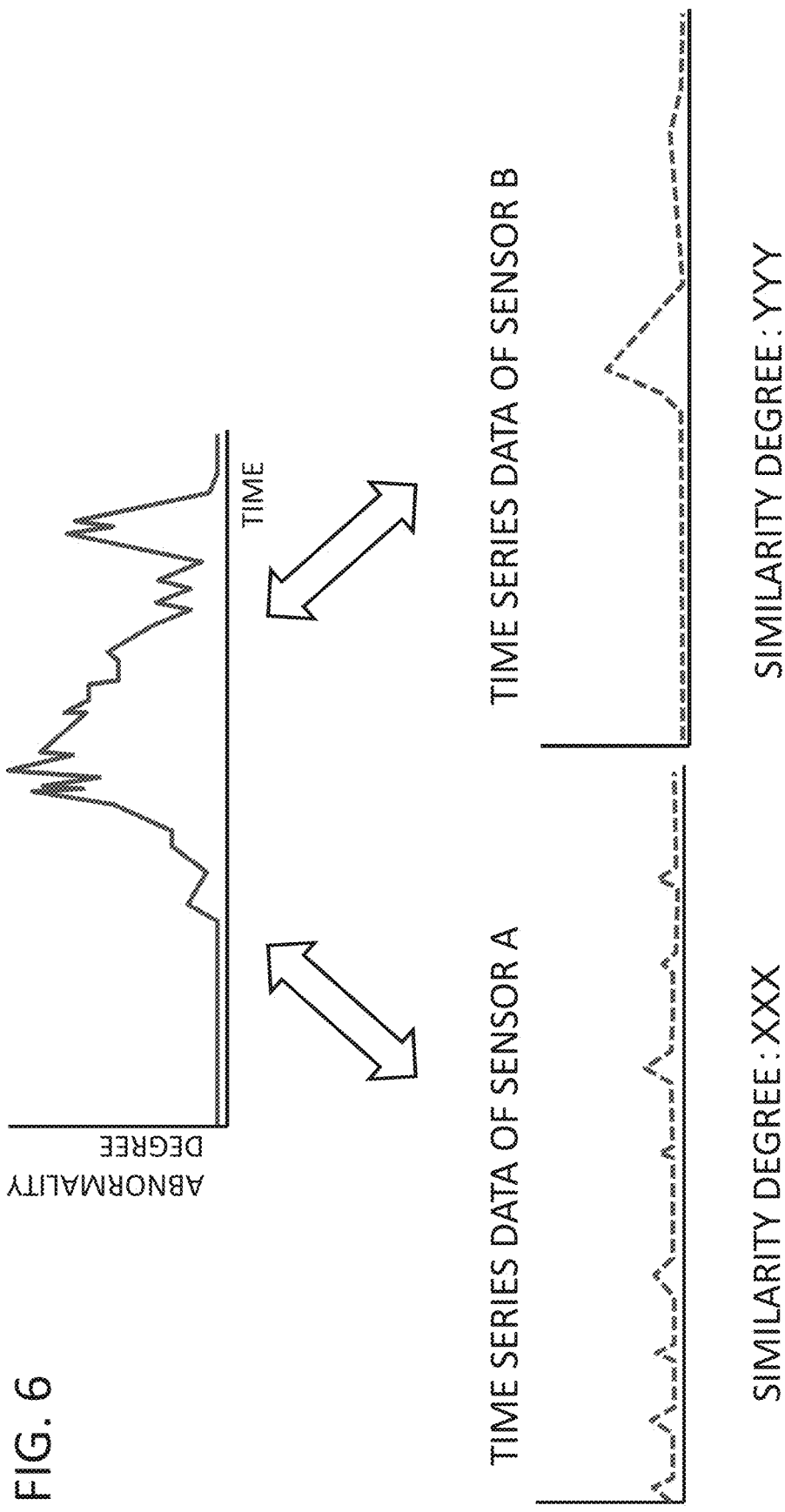
FIG. 6 is a diagram showing an example of calculating similarity of overall abnormality degree and time series data by an analysis support device in the first exemplary embodiment of the invention.

FIG. 6 is a diagram showing an example of calculating similarity degree between overall abnormality degree and time series data by the representative index selection part 105. In the example of FIG. 6 the representative index selection part 105 calculates similarity degree of time series data of sensor A and sensor B that are to be analyzed, and transition of abnormality degree. The representative index selection part 105 compares similarity degree XXX of sensor A and similarity degree YYY of sensor B, and selects the higher similarity degree as representative index. For example, where similarity degree YYY>similarity degree XXX, sensor B having similarity degree YYY is selected as representative index.

The result output part 106 outputs 1 or more sensors selected by the representative index selection part 105. For example in a case where the similarity degree shown in the lower part of FIG. 6 is obtained, the user may focus on sensor B for which a waveform is recognized as rising from a certain time, similar to abnormality degree, rather than sensor A for which no form of relationship with an abnormality of the system is recognized. By using this type of sensor data as representative index, it is possible to perform system abnormality detection, abnormality monitoring and abnormality cause identification with good accuracy.

Figure 7:
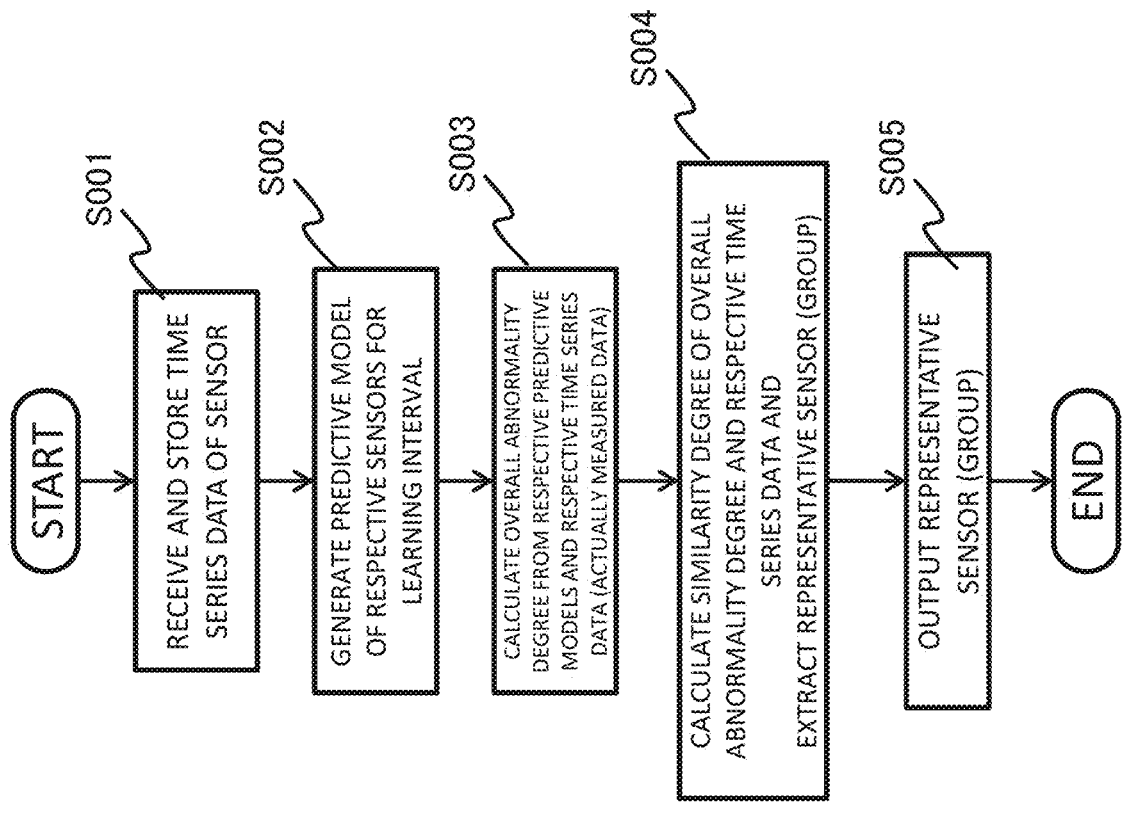
FIG. 7 is a flow chart representing operations of the analysis support device in the first exemplary embodiment of the invention.

Next, a detailed description is given concerning operations of the present exemplary embodiment, making reference to the drawings. FIG. 7 is a flow chart representing operations of the analysis support device in the first exemplary embodiment of the invention. Referring to FIG. 7, first, the analysis support device receives time series data of a sensor and accumulates the data in the time series data storage part 102 (step S001).

Next, the analysis support device 100 generates a predictive model of respective sensors in a learning period (step S002). It is to be noted that in step S002, all sensors need not be targets as time series data used in predictive model generation. For example, a sensor the user considers to be clearly unnecessary may be excluded (refer to the fourth exemplary embodiment).

Next, the analysis support device 100 calculates overall abnormality from respective predictive models and respective time series data (actually measured values) (step S003). Here, in a case where the time series data (actually measured values) after a certain time deviates largely from respective predicted values obtained from the respective predictive models and this state continues for a long time, for the overall abnormality degree also, a change is indicated where the abnormality degree increases from the relevant time.

Next, the analysis support device 100 calculates similarity of overall abnormality degree and respective time series data, and extracts (selects) representative sensor (group) (step S004).

Figure 8:
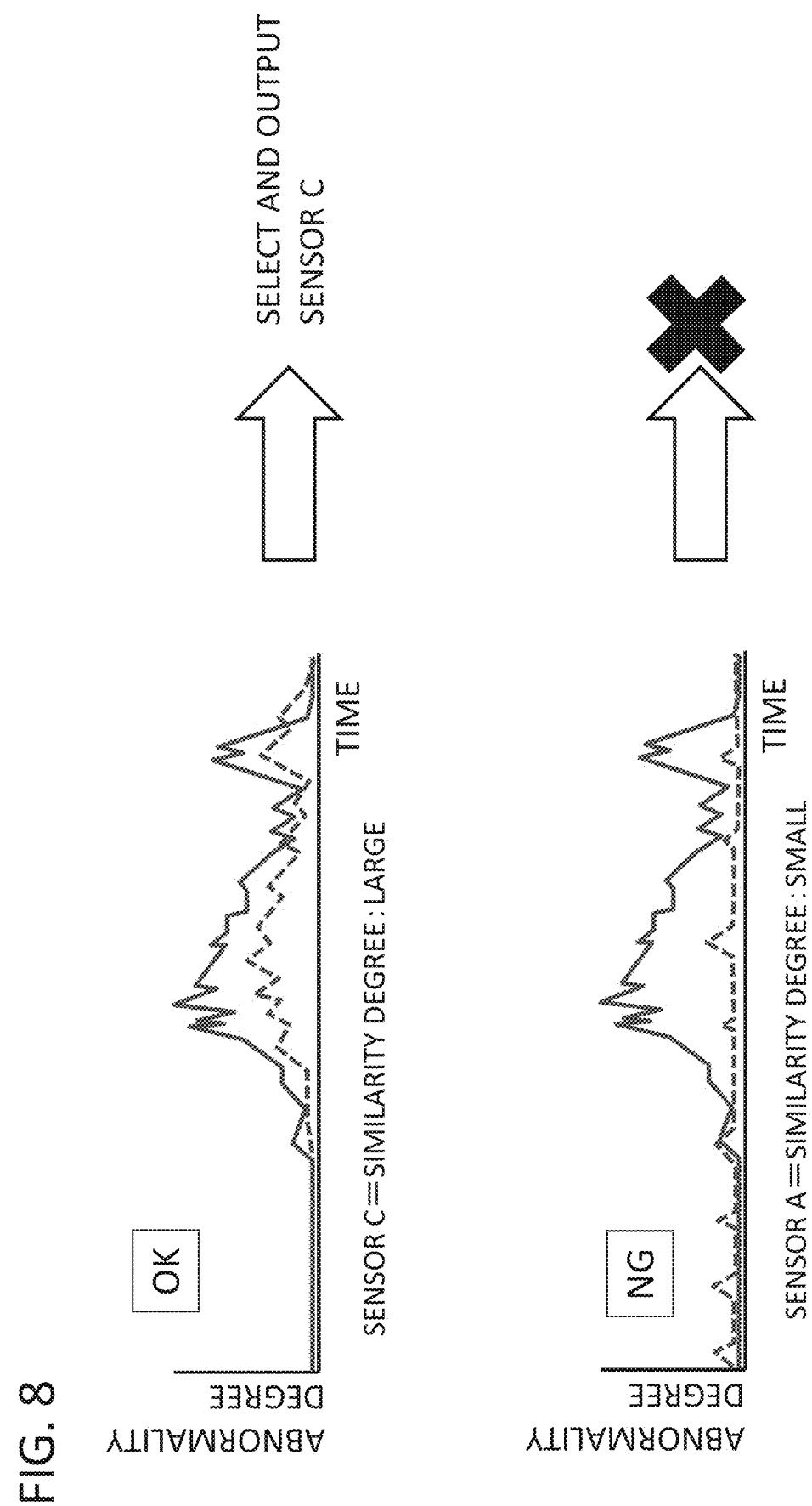
FIG. 8 is a diagram for describing an operation of selection of sensor, which is a representative index by the analysis support device in the first exemplary embodiment of the invention.

The upper part of FIG. 8 is a diagram showing similarity of overall abnormality degree and actually measured values of sensor C. In the same way, the lower part of FIG. 8 is a diagram showing similarity of overall abnormality degree and actually measured values of sensor A. As is clear from the two drawings, for values of sensor A, no relationship at all is recognized with change of overall abnormality degree. Therefore the similarity degree of the overall abnormality degree and the sensor A is determined to be relatively small, and sensor A is excluded from output target. On the other hand the values of sensor C increase with a small delay in change of overall abnormality degree, and increase and decrease trends thereafter match. Therefore the similarity degree of the overall abnormality degree and sensor C is determined to be relatively large, and sensor C is selected as output target.

Finally, the analysis support device 100 outputs the extracted (selected) representative sensor (group) (step S006). In this stage, a sensor with low similarity degree with transition of overall abnormality degree, that is, a sensor with low correlation with overall abnormality degree is filtered in step S004 and excluded from output target. By using the outputted sensor data as representative index, it is possible to perform system abnormality detection, abnormality monitoring and abnormality cause identification with good accuracy.

Figure 9:
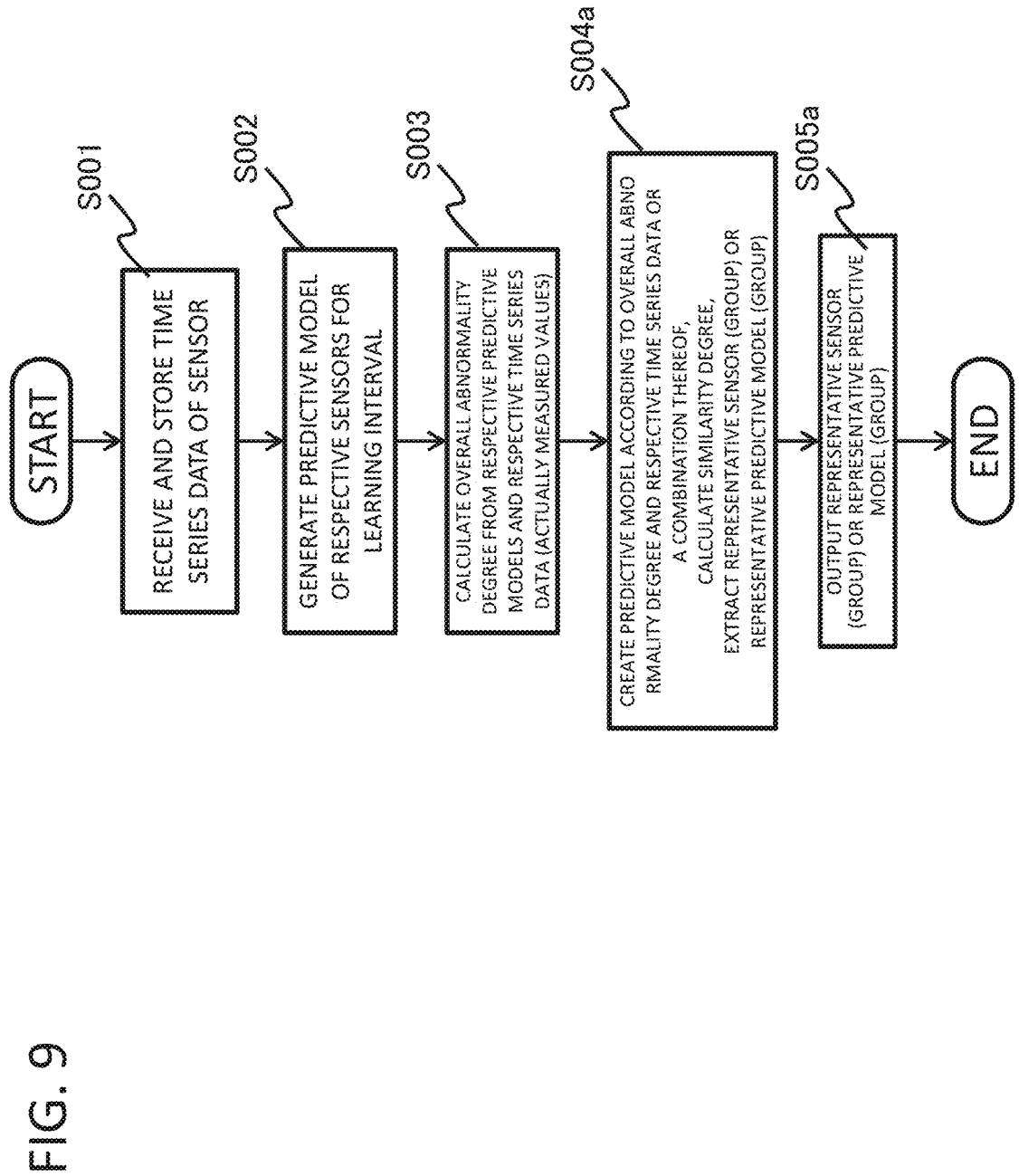
FIG. 9 is a flow chart representing operations of the analysis support device in accordance with a modified exemplary embodiment of the first exemplary embodiment of the invention.

It is to be noted that in the above description, as representative index, 1 or more sensors were described as being outputted, but as a representative index a modified embodiment is also possible where a predictive model (invariant) is outputted. FIG. 9 is a flow chart representing operations of the analysis support device in accordance with a modified exemplary embodiment of the first exemplary embodiment. A point of difference from the flow chart shown in FIG. 7 is that in step S004a, the analysis support device 100 uses not only time series data but also a predictive model created from the time series data; the similarly degree between the overall abnormality degree and predicated error of the predictive model is obtained; and if there is a predictive model with high similarly degree, that predictive model is selected as representative index.

The upper part of FIG. 10 shows actually measured values of 2 sensors P and Q, and predictive error of a predictive model using this data. As shown in the lower part of FIG. 10, by calculating the similarity degree between the predicted error obtained in this way and the overall abnormality degree, it is possible to select a predictive model (invariant) which can be a representative index.

According to this type of modified exemplary embodiment, it is possible to present to the user a predictive model (invariant) with a stronger correlation than individual sensor values.

Second Exemplary Embodiment

Figure 11:
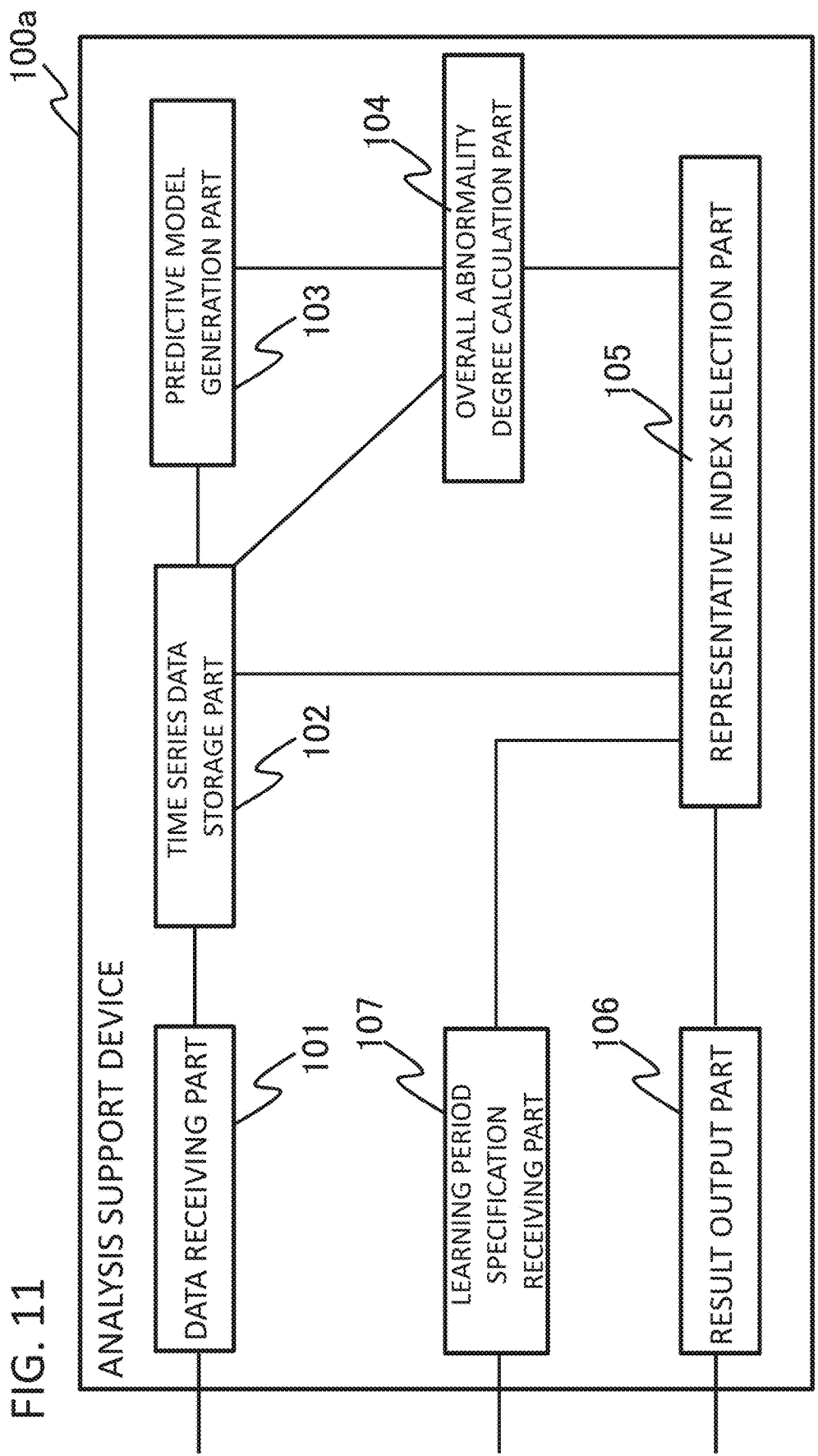
FIG. 11 is a diagram showing a configuration of an analysis support device of a second exemplary embodiment of the invention.

In the abovementioned first exemplary embodiment no particular limit was provided with regard to learning interval, but it is also effective to narrow down the learning interval. Continuing, a description is given concerning a second exemplary embodiment in which a representative index is selected that limits the learning interval to a fixed period up to where an abnormality occurs. FIG. 11 is a diagram showing a configuration of an analysis support device 100a of the second exemplary embodiment of the invention. A point of difference from the analysis support device 100 of the first exemplary embodiment shown in FIG. 3 is that a learning period specification receiving part 107 indicating a learning interval is added to the representative index selection part 105. Since the configuration and operation are otherwise the same as the first exemplary embodiment, a description is given below centered on points of difference.

The learning period specification receiving part 107 receives the specification of the learning period from a user and indicates the learning interval to the representative index selection part 105. Various embodiments for receiving the specification of the learning period may be considered; for example, it is possible to use a method in which a graph indicating change of overall abnormality degree as shown in FIG. 5 is displayed, and the learning interval is received using a pointing device or the like from the user.

The upper part of FIG. 12 is a diagram showing similarity of overall abnormality degree and actually measured values of sensor D, in a state in which the learning interval shown by the broken line is specified. In the same way, the lower part of FIG. 12 is a diagram representing similarity of overall abnormality degree and actually measured values of sensor E, for the same learning period. In the example of FIG. 12, changes that accompany the respective overall abnormality degrees of sensors D and E are recognized but, focusing on the learning interval, it is determined that similarity degree for sensor D is relatively larger than that of sensor E. As a result, sensor D rather than sensor E is selected as output target. It is to be noted that in the present exemplary embodiment, as in the first exemplary embodiment, it is possible to use a predictive model created from time series data to obtain similarity degree of predictive error of overall abnormality degree and predictive model, and if there is a predictive model with high similarity degree, that predictive model may be selected as representative index.

As described above, according to the second exemplary embodiment in which the learning interval is narrowed down, in addition to the effect of the first exemplary embodiment, it is possible to narrow down the predictive model and sensor indicating useful movement clarifying abnormality occurrence mechanism.

Third Exemplary Embodiment

Figure 13:
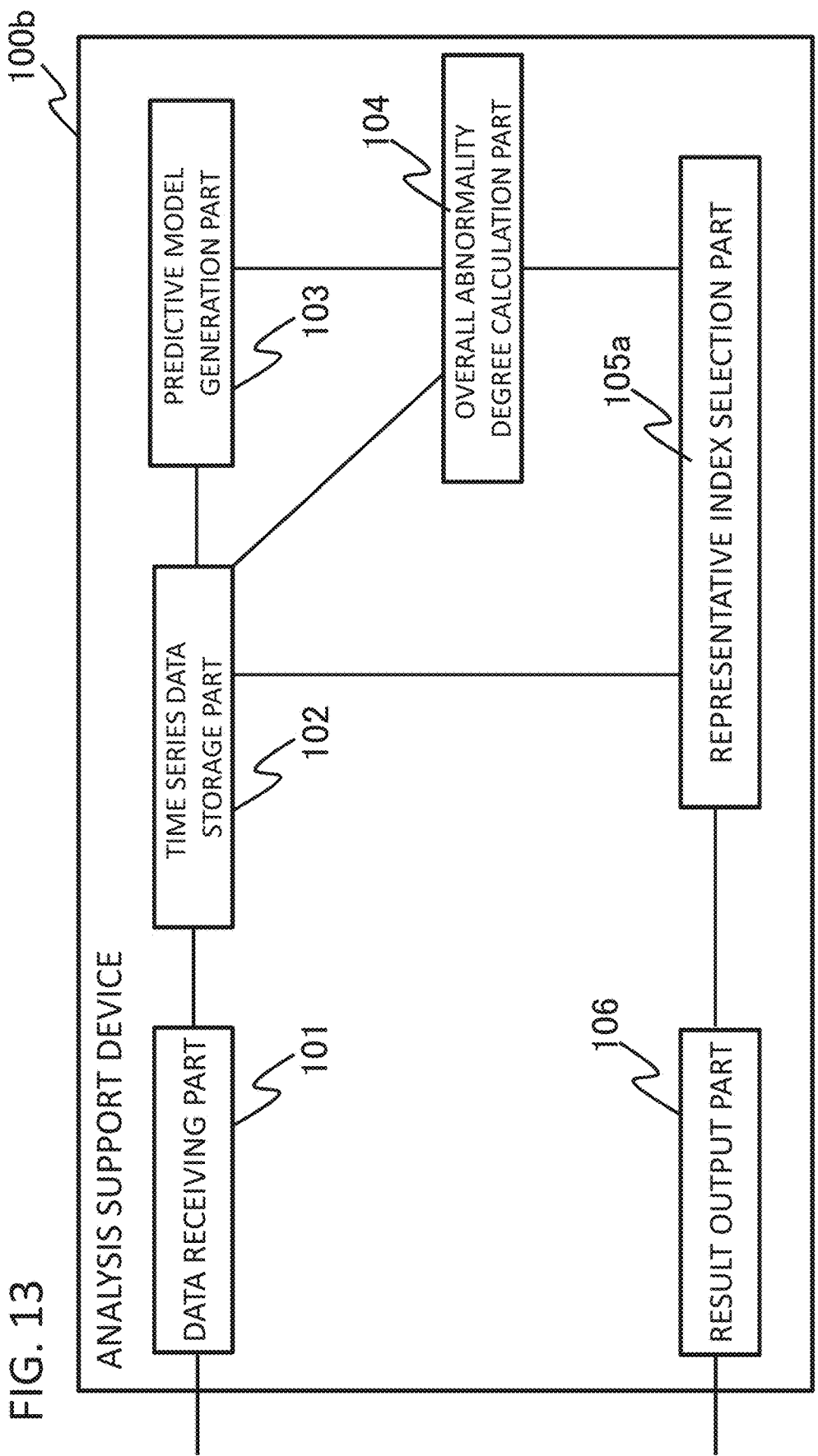
FIG. 13 is a diagram showing a configuration of an analysis support device in a third exemplary embodiment of the invention.

In the abovementioned first exemplary embodiment, a description was given in which a predictive model and sensor indicating movement similar to movement of overall abnormality degree are extracted, but here a description is given concerning a third exemplary embodiment in which a sensor is identified in which change appears in advance of an abnormality in the overall abnormality degree. FIG. 13 is a diagram showing a configuration of the analysis support device 100b of the third exemplary embodiment of the invention. A point of difference from the analysis support device 100 of the first exemplary embodiment shown in FIG. 3 is that a representative index selection part 105a has a function of calculating similarity degree by shifting time axis of the time series data back and forth. Since the configuration and operation are otherwise the same as the first exemplary embodiment, a description is given below centered on points of difference.

The representative index selection part 105a of the present exemplary embodiment, with regard to calculating the similarity degree of time series data accumulated in a time series data storage part 102 and time series change of the overall abnormality degree, shifts the time axis of the time series data by a prescribed time $k_1, k_2, \ldots, k_n$, and calculates similarity degree of n patterns. Here the prescribed time $k_1, k_2, \ldots, k_n$ is increased in a prescribed step from a prescribed judged lower limit $k_1$ (a negative value is also possible) up to a prescribed judged upper limit.

Figure 14:
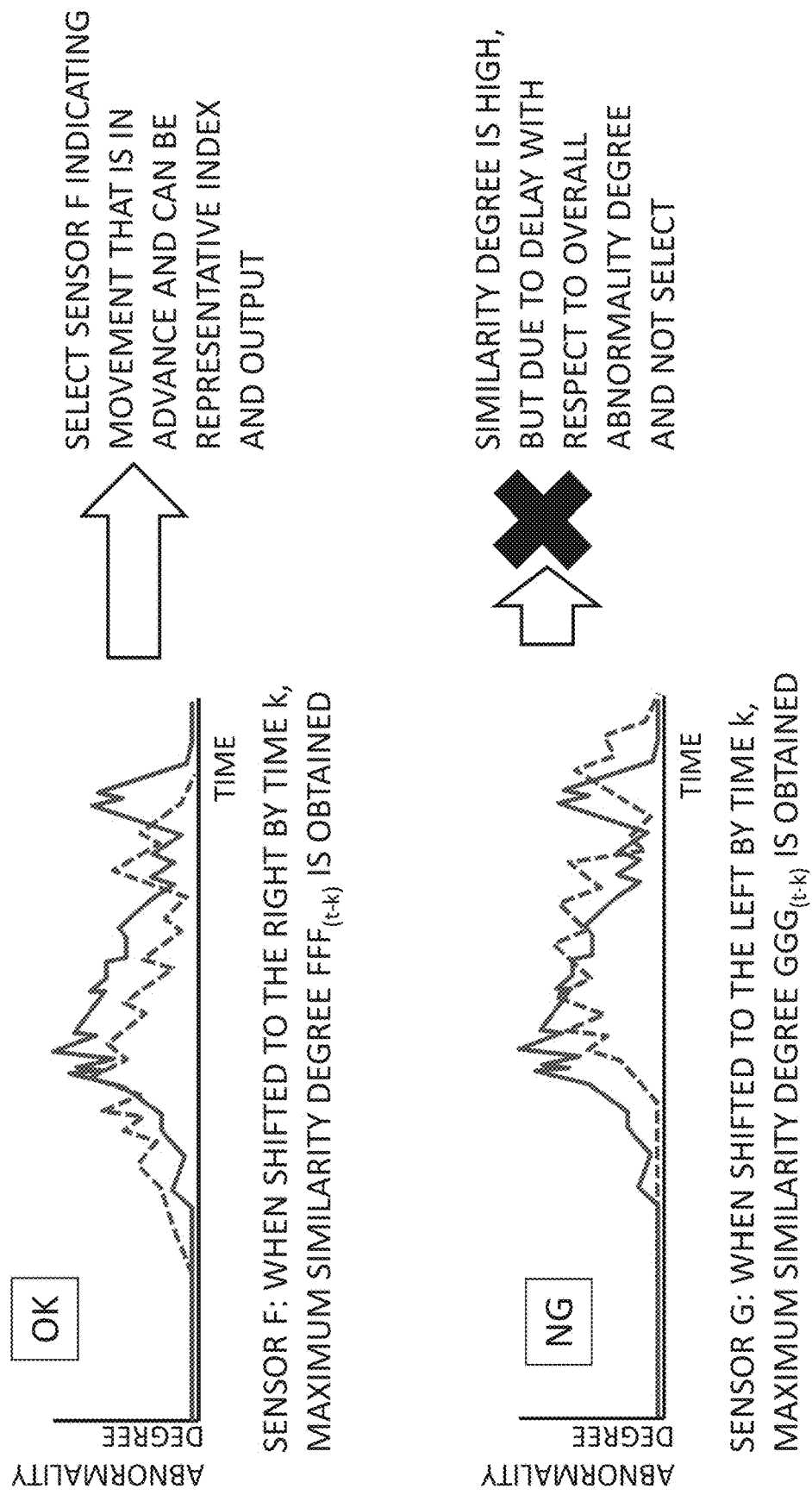
FIG. 14 is a diagram for describing an operation of selection of sensor, which is a representative index by the analysis support device in the third exemplary embodiment of the invention.

The upper part of FIG. 14 is a diagram representing similarity degree of actually measured values of sensor F shifted (time axis delayed) to the right by time k and overall abnormality degree. In the same way, the lower part of FIG. 14 is a diagram representing similarity degree of actually measured values of sensor G shifted (time axis advanced) to the left by time k and overall abnormality degree. In the case of the example in the upper part of FIG. 14, for sensor F the maximum similarity degree $FFF_{(t-k)}$ is obtained when a shift is made (time axis delayed) to the right by time k. In the same way in the example in the lower part of FIG. 14, for sensor G the maximum similarity degree $GGG_{(t-k)}$ is obtained when a shift is made (time axis advanced) to the left by time k.

In such a case, the representative index selection part 105a of the present exemplary embodiment selects a sensor giving priority to whether or not it is in advance with regard to the overall abnormality degree, rather than similarity degree high or low. For example, in FIG. 14, since for sensor F a change appears in advance of movement of overall abnormality degree, and a movement is shown that is similar to overall abnormality degree, the representative index selection part 105a selects sensor F as representative index. On the other hand, the representative index selection part 105a shows movement similar to overall abnormality degree but since sensor G lags movement of the overall abnormality degree, it is excluded from representative index candidates. Although not shown in the example of FIG. 14, if there is a sensor indicating movement similar to overall abnormality degree and neither in advance nor lagging movement of the overall abnormality degree (that is k=0 approximately), similar to the first exemplary embodiment, these may also be added to representative index candidates.

As described above, according to the third exemplary embodiment in which the time axis of the time series data is moved and similarity degree calculated, and a sensor that is in advance of overall abnormality degree is selected, in addition to the effects of the first exemplary embodiment it is possible to identify and show to the user a sensor having signs of an abnormality.

In the present exemplary embodiment, the result output part 106 may not only output a sensor indicating movement having similarity and being in advance, but also similarity degree of respective sensors, and time shift among respective sensors performing calculation (relative time from overall abnormality degree). FIG. 15 is a diagram showing an output example of a sensor list by an analysis support device 100b in the abovementioned present exemplary embodiment. In the example of FIG. 15, a list is generated listing sensors in which the extent of being in advance of the overall abnormality degree is large, and the similarity degree is high. As shown in FIG. 15, for 3 sensors: temperature 1, rate of flow 1 and amplitude 1, since time relative to overall abnormality degree has negative values, these are positioned as advance sensors that are effective in clarifying overall abnormality cause. Similarly for the 3 sensors: amplitude 2, temperature 2 and temperature 3, since time relative to overall abnormality degree has a value of 0, these are positioned as simultaneous sensors that move at the same time as the overall abnormality. Similarly for the 3 sensors: rate of flow 2, temperature 4 and amplitude 3, since time relative to overall abnormality degree has positive values, these are positioned as delay sensors that move with a delay to the overall abnormality. A user viewing these results focuses on a sensor in accordance with usage aim.

It is to be noted that, similar to the modified exemplary embodiment of the first exemplary embodiment, in the present exemplary embodiment it is possible to have a modified exemplary embodiment that calculates the similarity degree of a predictive model (invariant) and outputs the predictive model (invariant). FIG. 16 is a diagram showing another output example of a sensor list by the analysis support device 100b in the abovementioned present exemplary embodiment. In the example of FIG. 16, a list is generated listing a combination (predictive model) of sensors in which the extent of being in advance of the overall abnormality degree is large, and similarity degree is high. As shown in FIG. 16, for 3 predictive models obtained from a combination of sensors: temperature 1-temperature 2, rate of flow 1-temperature 2, and amplitude 1-temperature 3, since time relative to overall abnormality degree has a negative value, they are positioned as advance sensors that are effective in clarifying overall abnormality cause. Similarly, for 3 predictive models obtained from a combination of sensors: amplitude 2-amplitude 1, temperature 2-temperature 3, and rate of flow 3-temperature 2, since time relative to overall abnormality degree is 0, they are positioned as simultaneous models that move at the same time as the overall abnormality. Similarly, for 3 predictive models obtained from a combination of sensors: rate of flow 2-rate of flow 3, temperature 4-amplitude 4, and amplitude 3-rate of flow 4, since time relative to overall abnormality degree has positive values, they are positioned as delayed models that move with a delay with respect to all abnormality. A user viewing these results focuses on a predictive model in accordance with usage aim.

It is to be noted that display form or sorting order of respective sensors and models in the sensor and model lists shown in FIG. 15 and FIG. 16 are merely examples, and it is possible to have various modified forms. For example, FIG. 15 and FIG. 16 may be merged and both sensors and models displayed in one table. Or, for example, taking into account both size of minus range of relative time and similarity degree, an overall score may be calculated, and respective sensors and modes may be arranged and displayed in order of the overall score. In addition, the display may combine ancillary information such as position (arrangement location with regard to the system) of respective sensors, and usage and the like.

Fourth Exemplary Embodiment

Figure 17:
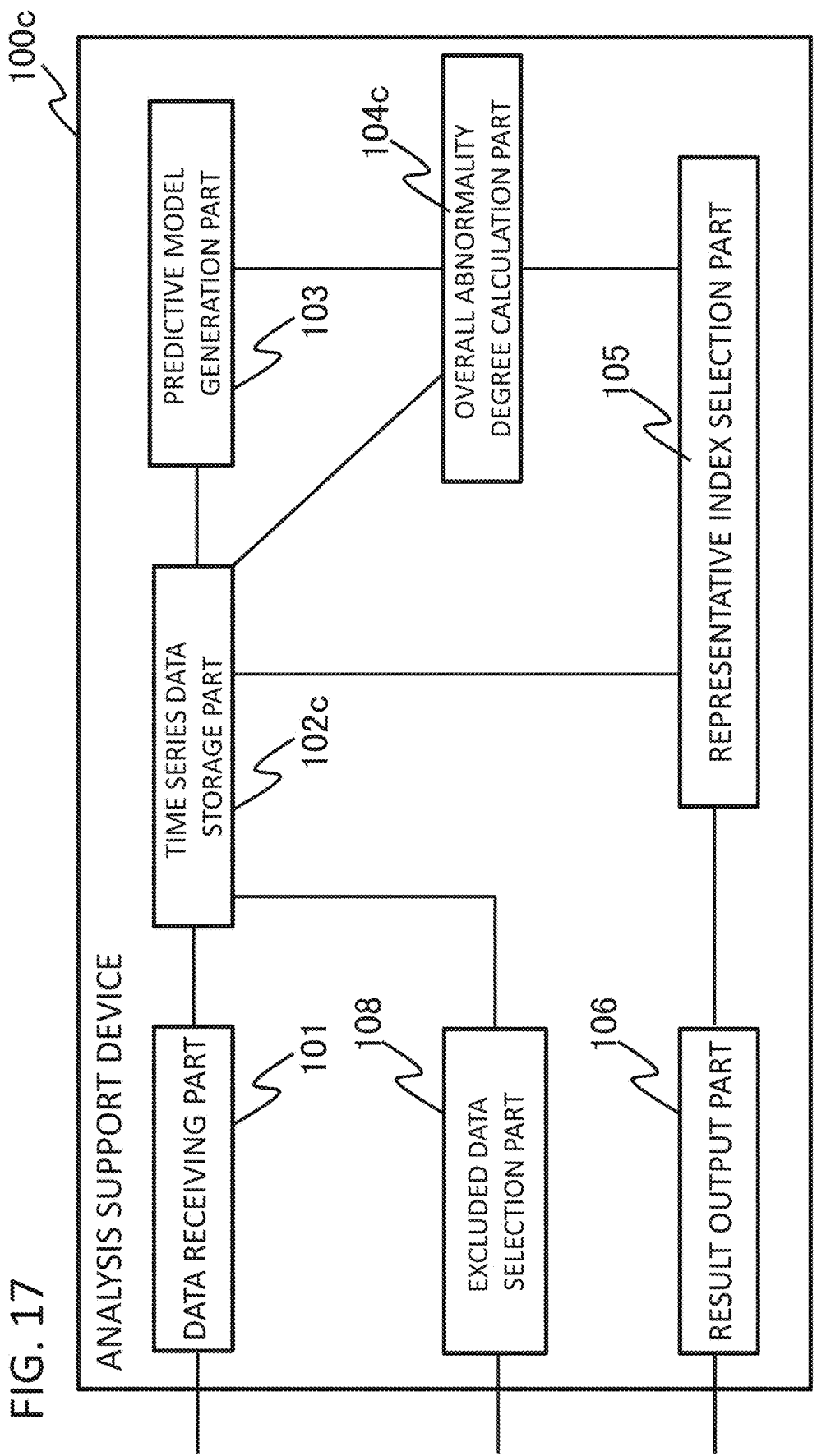
FIG. 17 is a diagram showing a configuration of an analysis support device in a fourth exemplary embodiment of the invention.

In calculation of overall abnormality degree in the abovementioned first to third exemplary embodiments, clearly unnecessary sensors are preferably excluded. Below a description is given concerning a fourth exemplary embodiment provided with a user interface to select sensor(s) to be excluded in calculating overall abnormality. FIG. 17 is a diagram showing a configuration of an analysis support device 100c of the fourth exemplary embodiment of the invention. Points of difference from the analysis support device 100 of the first exemplary embodiment shown in FIG. 3 are: that an exclusion flag can be set in respective data in a time series data storage part 102c, that an excluded data selection part 108 is added, and that an overall abnormality degree calculation part 104c has a configuration that does not use sensors having an exclusion flag and predictive models using those sensors. Since the configuration and operation are otherwise the same as the first exemplary embodiment, a description is given below centered on points of difference.

The excluded data selection part 108 presents a sensor selection list to the user, and in calculating the overall abnormality degree, selection of sensors and predictive models not to be used is received from the user. It is to be noted that the excluded data selection part 108 may present a list of sensors currently selected (not excluded) and overall abnormality degree using these to the user, and nay receive the excluded data sensors using interactive processing. In this case, a method may be used that does not simply request recalculation of overall abnormality degree with respect to the overall abnormality degree calculation part 104c, but corrects the overall abnormality degree by removing contribution degree amount of predictive models and sensors selected for exclusion from the overall abnormality degree selected the previous time, and may reduce the number of calculations.

FIG. 18 is a diagram showing an example of a user interface for receiving a selection of sensors not used in calculation of overall abnormality degree. In FIG. 18, besides sensor name, a "graph" field is provided, and it is possible to comprehend the general movement of respective sensors. The user views the movement of respective sensors, and excludes sensors clearly affected by human operations or sensors affected by incidentally occurring events. The excluded data selection part 108 sets exclusion flags in relevant data of the time series data storage part 102c, for sensors selected by the user. It is to be noted that in the example of FIG. 18, the configuration receives a selection of excluded data sensors, but it is also possible to display a list of predictive models and to receive a selection of predictive models to be excluded.

Along with the list shown in FIG. 18, candidates excluded in advance may be displayed for the user. For example, sensors that are exclusion candidates may be displayed with a gray scale, or the like. Or, it is possible to separately display reasons for selecting as exclusion candidates or calculation results. The selection of sensors as exclusion candidates may be given by text data with the list of sensors to be excluded in advance as setting values, or a judgment may be given by calculation of similarity degree with a particular pattern (linked with ambient temperature, characteristically outputted at a fixed time or day of the week, etc.) As a reason for selecting as exclusion candidate, a display may be provided as in, for example, "linking with ambient temperature (degree of concurrence 90%)".

An overall abnormality degree calculation part 104c uses time series data for which an exclusion flag is not set, among time series data contained in the time series data storage part 102c, to calculate overall abnormality degree.

According to the present exemplary embodiment, since the overall abnormality degree is calculated more delicately, selection of sensors by a representative index selection part 105 is also more delicate. It is to be noted that in the example of FIG. 17, a configuration is shown in which the excluded data selection part 108 is added to the configuration of the first exemplary embodiment, but in the second and third exemplary embodiments also it is possible to add the excluded data selection part 108 in the same way.

Fifth Exemplary Embodiment

Figure 19:
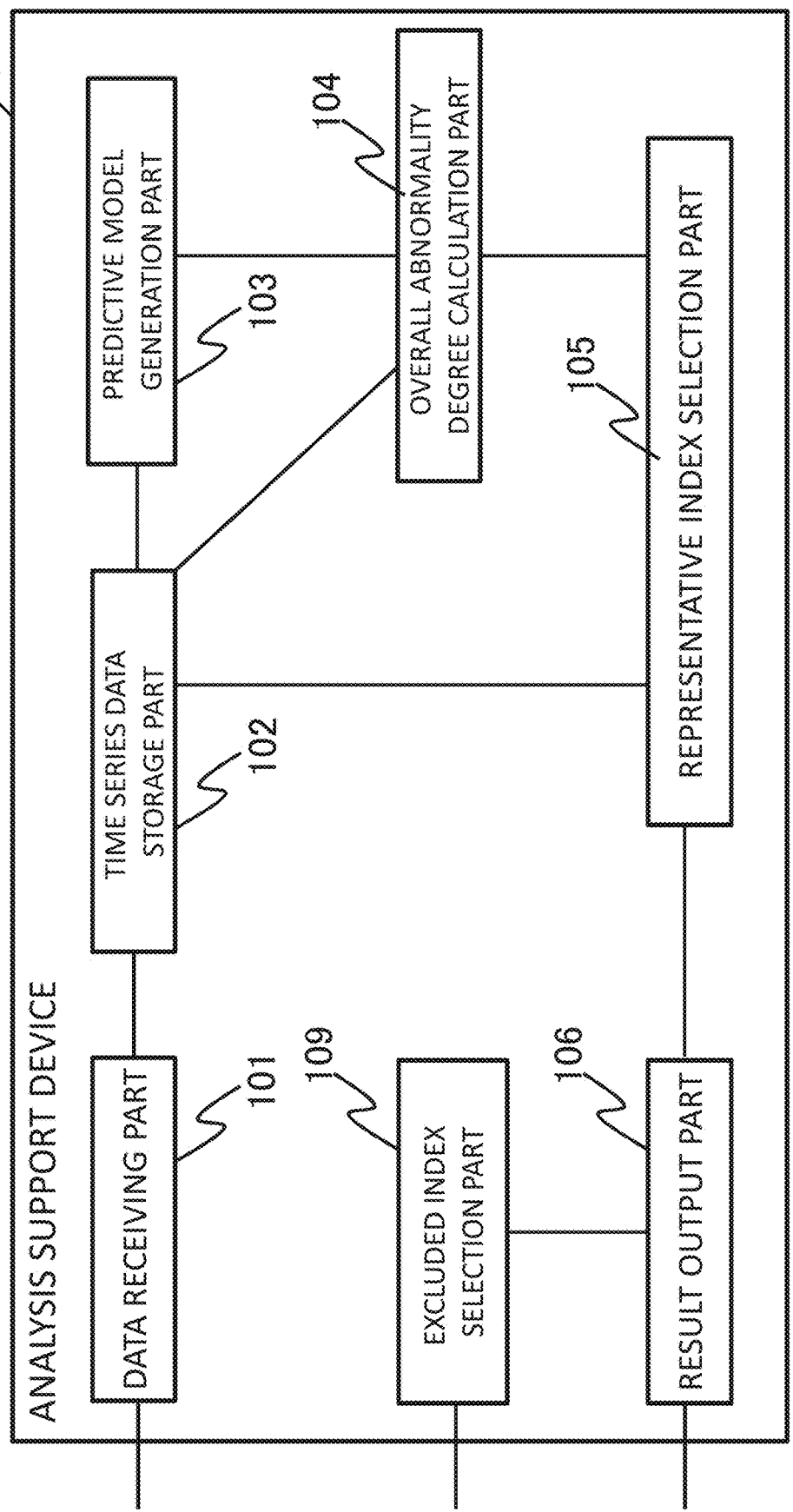
FIG. 19 is a diagram showing a configuration of an analysis support device in a fifth exemplary embodiment of the invention.

In accordance with the scale of a system, it can be expected that the number of sensors and predictive models after extraction as used in the abovementioned first to fourth exemplary embodiments will become very large. Below, a description is given concerning a fifth exemplary embodiment provided with a user interface that organizes the sensors and predictive models after extraction. FIG. 19 is a diagram showing a configuration of an analysis support device 100d of the fifth exemplary embodiment of the invention. A point of difference from the analysis support device 100 of the first exemplary embodiment shown in FIG. 3 is that an exclusion index selection part 109 is added. Since the configuration and operation are otherwise the same as the first exemplary embodiment, a description is given below centered on points of difference.

The exclusion index selection part 109 receives a selection of unnecessary (not displayed) sensors or predictive models from the user. It is to be noted that a result selected by the exclusion index selection part 109 is sent to a result output part 106, and a display by the result output part 106 is updated.

FIG. 20 is a diagram showing an example of a user interface for receiving a selection of an unnecessary (not displayed) sensors and predictive model. In FIG. 20, besides sensor name, similarity degree and "graph" field are provided, and it is possible to comprehend the general movement of respective sensors. The user views the movement of respective sensors, and excludes sensors clearly affected by human operations or sensors affected by incidentally occurring events.

The result output part 106 updates a sensor list to be outputted as representative index, based on a selection result by the exclusion index selection part 109. FIG. 21 is an example of a sensor list after an updating button of FIG. 20 is clicked. As in FIG. 21, by displaying unnecessary (not displayed) sensors and predictive models, visibility of sensors to be spotlighted is improved.

It is to be noted that in the example of FIG. 21, unnecessary (not displayed) sensors are not displayed, but it is also possible to provide a separate display in another window or the like. For example, by this type of operation it is possible to create a list of sensors affected by operations by a human.

It is to be noted that the respective parts (processing means) of the analysis support device control device shown in the abovementioned respective diagrams may be implemented by a computer program that executes the abovementioned respective processing on a computer configuring the analysis support device, using hardware thereof.

A description has been given above of respective exemplary embodiments of the present invention, but the present invention is not limited to the abovementioned exemplary embodiments, and modifications, substitutions and adjustments may be added within a scope that does not depart from fundamental technical concepts of the invention. Network configurations, respective element configurations and forms for representing message shown in the respective drawings are examples for the purpose of aiding understanding of the invention, and are not intended to limit the invention to configurations illustrated in the drawings.

Finally, preferred modes of the present invention are summarized.

[First Mode]

(Refer to the system analysis support device according to the first aspect described above.)

[Second Mode]

The representative index selection part of the abovementioned analysis support device may have a configuration that selects time series data (items) indicating change similar to transition of overall abnormality degree of the system that is to be analyzed, in a period until transition of the overall abnormality degree of the system that is to be analyzed exceeds a prescribed threshold.

[Third Mode]

The representative index selection part of the abovementioned analysis support device may have a configuration that selects time series data (items) wherein transition of overall abnormality degree of the system that is to be analyzed is similar to transition of overall abnormality degree of the system that is to be analyzed, and changes in advance thereof.

[Fourth Mode]

The representative index selection part of the abovementioned analysis support device may have a configuration that selects time series data (items) in which change similar to transition of overall abnormality degree of the system that is to be analyzed appears in advance by a prescribed time k.

[Fifth Mode]

The abovementioned analysis support device may use, as the time series data (items), time series data (items) obtained by inputting time series data (items) obtained from a plurality of sensors, to a prescribed predictive model.

[Sixth Mode]

The analysis support device is further preferably provided with a user interface that displays a list of time series data (items) along with degree of similarity with transition of overall abnormality degree of the system to be analyzed, from among the series data (items), and preferably receives from a user a selection of time series data (items) indicating change similar to transition of overall abnormality degree of the system that is to be analyzed.

[Seventh Mode]

The user interface displaying the list of time series data preferably displays, with regard to individual time series data items (items), information of degree of similarity with transition of overall abnormality degree of the system that is to be analyzed, and of advance time thereof.

[Eighth Mode]

The abovementioned analysis support device may be provided with an excluded data selection part that receives a selection of time series data (items) to be excluded in calculation of transition of the abnormality degree representing overall abnormality degree of the system that is to be analyzed in the overall abnormality degree calculation part.

[Ninth Mode]

(Refer to the system analysis support method according to the second aspect described above.)

[Tenth Mode]

(Refer to the program according to a third aspect described above.)

It is to be noted that the ninth and tenth modes described above may be expanded with regard to the second to eighth modes, similar to the first mode.

It is to be noted that the various disclosures of the abovementioned Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Various combinations and selections of various disclosed elements (including respective elements of the respective claims, respective elements of the respective exemplary embodiments and examples, respective elements of the respective drawings and the like) are possible within the scope of the disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST

11 data acquisition part
12 predictive model storage part
13 overall abnormality degree calculation part
14 representative index selection part
100, 100a to 100d analysis support device
101 data receiving part
102, 102c time series data storage part
103 predictive model generation part
104, 104c overall abnormality degree calculation part
105, 105a representative index selection part
106 result output part
107 learning period specification receiving part
108 excluded data selection part
109 excluded index selection part
300 updating button

What is claimed is:

1. A system analysis support device, comprising:
a memory storing a program including instructions, and
a processor configured to execute the instructions, that when executed performs:
obtaining time series data measured in a system that is to be analyzed,
calculating a transition of an abnormality degree representing an overall abnormality degree of the system that is to be analyzed, using a predictive model generated so that, with 2 or more time series data items as input, values representing a relationship between said 2 or more time series data items are outputted, and the time series data items;
receiving specification of a learning interval that is a part of the time series data from a user and setting the learning interval according to the specification for selecting and presenting time series data items; and
selecting and presenting time series data items as a representative index indicating change similar to transition of overall abnormality degree of the system that is to be analyzed, from among said time series data items.

2. The system analysis support device according to claim 1,
wherein the processor is further configured to execute the instructions to perform:
calculating a similarity degree by shifting a determined time of the time series data back or forth; and
said selecting comprises selecting time series data items indicating the change similar to the transition of the overall abnormality degree of the system that is to be analyzed, in a period until the transition of said overall abnormality degree of the system that is to be analyzed exceeds a prescribed threshold, based on the calculated similarity degree.

3. The system analysis support device according to claim 1, wherein said selecting comprises selecting time series data items in which the change similar to transition of overall abnormality degree of the system that is to be analyzed appears in advance by a prescribed time k.

4. The system analysis support device according to claim 1, wherein, as said time series data items, use is made of time series data items obtained by inputting time series data items obtained from a plurality of sensors, to a prescribed predictive model.

5. The system analysis support device according to claim 1, wherein the processor is further configured to execute the instructions to perform:
displaying a list of time series data items along with degree of similarity to transition of overall abnormality degree of the system that is to be analyzed, from among said time series data items, wherein
the device receives from a user a selection of time series data items indicating the change similar to transition of overall abnormality degree of the system that is to be analyzed.

6. The system analysis support device according to claim 5, wherein
said displaying said list of time series data items displays, with regard to individual time series data items, information of the degree of similarity with transition of overall abnormality degree of the system that is to be analyzed, and of advance time thereof.

7. The system analysis support device according to claim 1, wherein the processor is further configured to execute the instructions to perform:
receiving a selection of an exclusion candidate of time series data items in calculation of transition of said abnormality degree representing overall abnormality degree of the system that is to be analyzed in said calculating overall abnormality degree; and displaying a reason for selecting the exclusion candidate.

8. The system analysis support device according to claim 1,
wherein the processor is further configured to execute the instructions to perform:
displaying a list of predictive models instead of the selecting and presenting time series data items;
receiving a selection of a predictive model to be excluded, from a user; and
excluding the selected predictive model.

9. A system analysis support method, performed by a computer, comprising:
obtaining time series data measured in a system that is to be analyzed,
calculating a transition of an abnormality degree representing an overall abnormality degree of the system that is to be analyzed, using a predictive model generated so that, with 2 or more time series data items as input, values representing a relationship between said 2 or more time series data items are outputted, and the time series data items;
receiving specification of a learning interval that is a part of the time series data from a user and setting the learning interval according to the specification for selecting and presenting time series data items; and
selecting and presenting time series data items as a representative index indicating change similar to transition of overall abnormality degree of the system that is to be analyzed, from among said time series data items.

10. A non-transitory computer-readable recording medium storing thereon a program that when executed by a computer performs a method comprising:
obtaining time series data measured in a system that is to be analyzed,
calculating a transition of an abnormality degree representing an overall abnormality degree of the system that is to be analyzed, using a predictive model generated so that, with 2 or more time series data items as input, values representing a relationship between said 2 or more time series data items are outputted, and the time series data items;
receiving specification of a learning interval that is a part of the time series data from a user and setting the learning interval according to the specification for selecting and presenting time series data items; and
selecting and presenting time series data items as a representative index indicating change similar to transition of overall abnormality degree of the system that is to be analyzed, from among said time series data items.

* * * * *